US007669036B2

(12) United States Patent
Brown et al.

(10) Patent No.: US 7,669,036 B2
(45) Date of Patent: Feb. 23, 2010

(54) DIRECT PATH MONITORING BY PRIMARY PROCESSOR TO EACH STATUS REGISTER IN PIPELINE CHAINED SECONDARY PROCESSORS FOR TASK ALLOCATION VIA DOWNSTREAM COMMUNICATION

(75) Inventors: James M Brown, San Diego, CA (US); Thomas Fortier, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 280 days.

(21) Appl. No.: 11/763,377

(22) Filed: Jun. 14, 2007

(65) Prior Publication Data

US 2008/0313380 A1 Dec. 18, 2008

(51) Int. Cl.
*G06F 15/163* (2006.01)
(52) U.S. Cl. .......................................... 712/30; 710/18
(58) Field of Classification Search ........................ None
See application file for complete search history.

(56) References Cited

U.S. PATENT DOCUMENTS

| | | | |
|---|---|---|---|
| 6,341,324 B1 | 1/2002 | Caulk et al. | |
| 6,392,654 B1 * | 5/2002 | Gallotta et al. | 345/503 |
| 6,829,697 B1 * | 12/2004 | Davis et al. | 712/21 |
| 6,963,613 B2 * | 11/2005 | MacInnis et al. | 375/240.25 |
| 7,073,048 B2 | 7/2006 | Harthcock | |
| 2002/0078285 A1 * | 6/2002 | Hofstee et al. | 710/260 |
| 2004/0268088 A1 * | 12/2004 | Lippincott et al. | 712/25 |

FOREIGN PATENT DOCUMENTS

EP 0473452 A2 * 3/1992

OTHER PUBLICATIONS

International Search Report—PCT/US08/066453—International Search Authority, European Patent Office—Sep. 29, 2008.
Written Opinion—PCT/US08/066453—International Search Authority, European Patent Office—Sep. 29, 2008.
Kolinummi P., et al., "Chained backplane communication architecture for scalable multiprocessor systems," Journal of Systems Architecture, Elsevier Science Publishers BV, Amsterdam, NL, vol. 46, No. 11, Sep. 1, 2000, pp. 955-972.
Hey A.J.G., et al., "Multi-paradigm parallel programming," System Sciences, 1989. vol. II: Software Track, Proceedings of the Twen TY-Second Annual Hawaii International Conference on Kailua-Kona, HI, Jan. 3-6, 1989, Washington, DC, IEEE Conput. Soc. PR, Jan. 3, 1989, pp. 716-725.
European Search Report—EP08006412—Search Authority, Munich—Jul. 4, 2008.
European Written Opinion—EP08006412—Search Authority, Munich—Jul. 4, 2008.

* cited by examiner

*Primary Examiner*—Kenneth S Kim
(74) *Attorney, Agent, or Firm*—Michael J. Dehaemer

(57) ABSTRACT

Resource management techniques in multi-processor systems are described. Embodiments include a multi-processor system having a primary processor for communication with pipelined secondary processors. The secondary processors include registers containing status information for tasks executed by the respective secondary processors. The primary processor is provided with direct access to contents of the registers and manages computational and memory resources of the multi-processor system based on the acquired status information.

31 Claims, 3 Drawing Sheets

DIRECT PATH MONITORING BY PRIMARY PROCESSOR TO EACH STATUS REGISTER IN PIPELINE CHAINED SECONDARY PROCESSORS FOR TASK ALLOCATION VIA DOWNSTREAM COMMUNICATION

BACKGROUND

I. Field

The present disclosure relates generally to the field of multi-processor systems and, more specifically, to techniques for resource management in multi-processor systems having a primary processor and pipelined secondary processors.

II. Background

In complex computer systems common workload is often performed in parallel by a plurality of processors. A multi-processor system typically includes a primary processor administering a plurality of pipelined (i.e., connected in series) processors or co-processors, which are collectively referred to herein as secondary processors. In some applications, master-slave relationship may be formed between the primary processor and secondary processors. Such multi-processor systems may be used, for example, for processing of large amounts of video data or rendering graphics, among other computationally intensive applications.

In operation, instructions and, occasionally, data blocks are forwarded by the primary or a respective intermediate secondary processor downstream to the adjacent secondary processor, and acknowledgements confirming completion of particular tasks (i.e., task status data) are communicated by the secondary processors upstream to the primary processor. During execution of an application program, the primary processor assigns new tasks to the secondary processors or re-allocates computational and memory resources in the system upon receipt of acknowledgements that the preceding tasks have been completed.

However, repetitive re-transmission of the acknowledgements to the primary processor through a chain of pipelined secondary processors takes substantial time and constitutes a computational overhead, which adversely affects overall performance and efficiency of the multi-processor system. In particular, delays associated with sequential re-transmission of the acknowledgements limit command throughput and design flexibility of such systems. Despite the considerable efforts in the art devoted to increasing efficiency of resource management in the multi-processor systems having pipelined secondary processors, further improvements would be desirable.

SUMMARY

Techniques for resource management in a multi-processor system including a primary processor and pipelined secondary processors are described herein. In an embodiment, at least one secondary processor is provided with a register containing status information for tasks executed by that secondary processor. The register is directly accessible by the primary processor via a dedicated data port of the secondary processor and a bus connecting the port to the primary processor. Alternatively, the register may be formed in a portion of a system memory that is directly accessible by the primary processor. In operation, the status information from intermediate secondary processors bypasses the upstream secondary processors and, as such, may be available to the primary processor in a real time.

In exemplary designs, the disclosed techniques are used for managing computational and memory resources in multi-processor systems of wireless communication devices during execution of video applications, such as processing of video data or rendering graphics.

Various aspects and embodiments of the invention are described in further detail below.

The Summary is neither intended nor should it be construed as being representative of the full extent and scope of the present invention, which these and additional aspects will become more readily apparent from the detailed description, particularly when taken together with the appended drawings.

Figure 1:
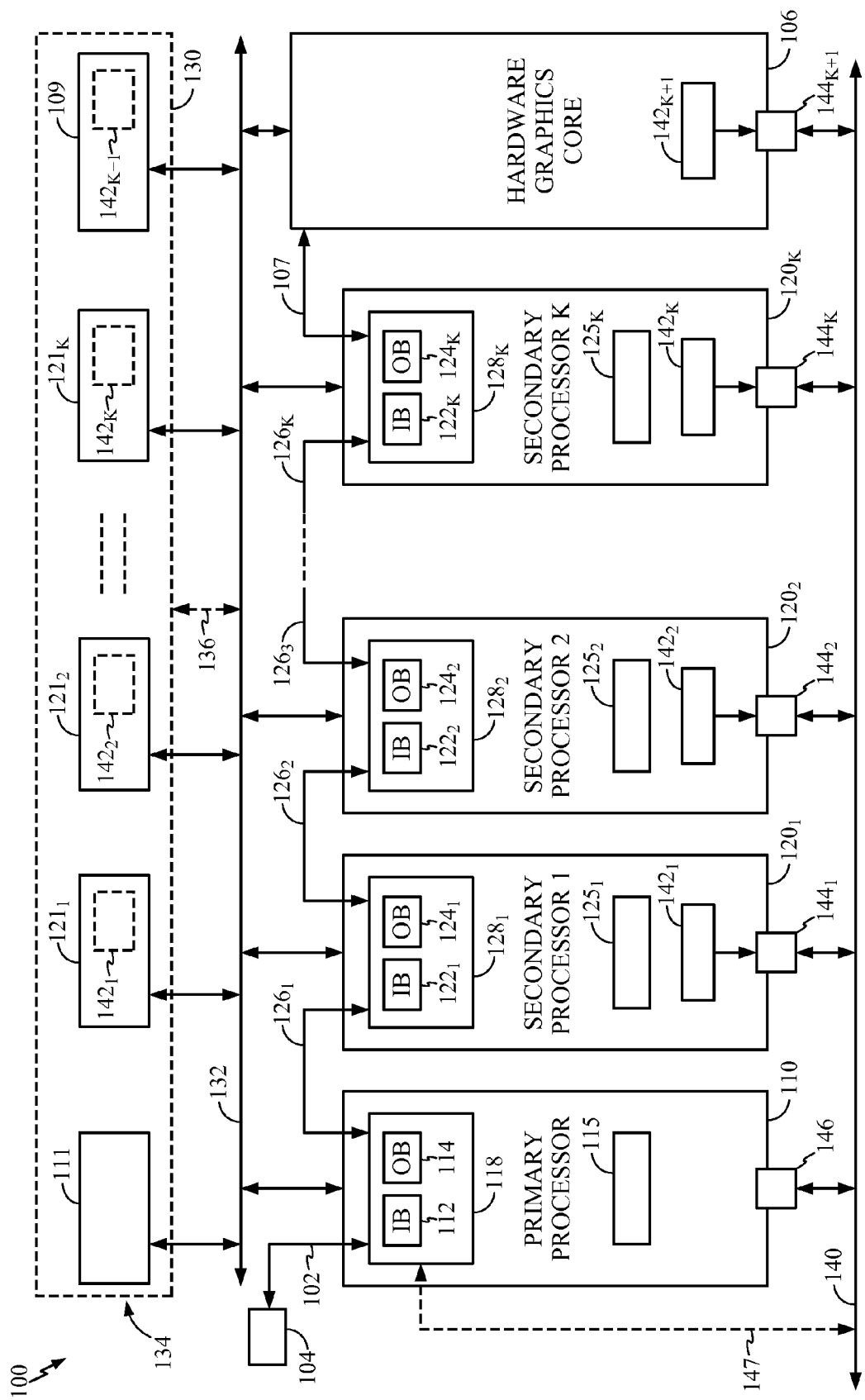
FIG. 1 shows a block diagram of an exemplary multi-processor system.

To facilitate understanding, identical reference numerals have been used, where possible, to designate identical elements that are common to the figures, except that suffixes may be added, when appropriate, to differentiate such elements. The images in the drawings are simplified for illustrative purposes and are not depicted to scale. It is contemplated that features or steps of one embodiment may be beneficially incorporated in other embodiments without further recitation.

The appended drawings illustrate exemplary embodiments of the invention and, as such, should not be considered as limiting the scope of the invention that may admit to other equally effective embodiments.

DETAILED DESCRIPTION

The term "exemplary" is used herein to mean "serving as an example, instance, or illustration." Any embodiment or design described herein as "exemplary" is not necessarily to be construed as preferred or advantageous over other embodiments or designs.

Referring to the figures, FIG. 1 depicts a block diagram of an exemplary multi-processor system 100 in accordance with one embodiment of the present invention. The system 100 may be used for processing video data and/or rendering graphics, among other computationally intensive data processing applications. In one exemplary embodiment, the system 100 is a portion of a graphics processing unit (GPU) of a wireless communication apparatus, such as a cellular phone, a video game console, a personal digital assistant (PDA), a laptop computer, an audio/video-enabled device (e.g., video-enabled MP3 player), and the like.

The GPU may be compliant, for example, with a document "OpenVG Specification, Version 1.0," Jul. 28, 2005, which is publicly available. This document is a standard for 2D vector graphics suitable for handheld and mobile devices, such as cellular phones and other referred to above wireless communication apparatuses. Additionally, the GPU 402 may also be compliant with OpenGL2.0, OpenGL ES2.0, or D3D9.0 graphics standards.

In the depicted embodiment, the system 100 illustratively includes a primary processor 110, a plurality of pipelined secondary processors $120_1$-$120_K$, a memory 130, an optional hardware graphics core 106, a memory bus 132, an acknowledgements bus 140, and system interfaces 102, $126_1$-$126_K$, and 107, where K is an integer and K≧2.

In the depicted embodiment, the primary processor 110 and the secondary processors $120_1$-$120_K$ are interconnected using the system interfaces $126_1$-$126_K$, and the secondary processor is connected to the hardware graphics core 106 using the system interface 107, respectively. In other embodiments (not shown), at least one of the secondary processors $120_1$-$120_K$ may be a portion of the hardware graphics core 106 or, alternatively, perform functions of the hardware graphics core 106.

The primary processor 110, the pipelined secondary processors $120_1$-$120_K$, and hardware graphics core 106 may be formed on a single integrated circuit (IC). Such IC may be a portion of, for example, a system-on-chip (SoC) integrated circuit device of a wireless communication apparatus. Alternatively, the primary processor 110 and at least one of the secondary processors $120_1$-$120_K$ or the hardware graphics core 106 or portions thereof may be formed on separate ICs.

In embodiments, each of the system interfaces 102, $126_1$-$126_K$, and 107 includes a command bus and, optionally, at least portions of data or address busses (not shown). The primary processor 110 and secondary processors $120_1$-$120_K$ may also include sub-processors, internal memories, peripheral devices, support circuits, and the like elements, which are collectively referred to herein as modules 115 and $120_1$-$120_K$, respectively.

The primary processor 110 comprises an input/output (I/O) module 118 including an input buffer (IB) 112 and an output buffer (OB) 114. Correspondingly, each of the secondary processors $120_1$-$120_K$ comprises a respective input/output (I/O) module 128 including an input buffer 122 and an output buffer 124. In operation, the I/O modules 118 and $120_1$-$120_K$ facilitate communications within the system 100 or to/from the system 100.

Via a respective bi-directional system interface 126, an input buffer 122 of a preceding (i.e., upstream) secondary processor 120 is connected to an output buffer 124 of the adjacent downstream secondary processor. For example, an input buffer $122_2$ of a secondary processor $120_2$ is connected, via a system interface $126_2$, to an output buffer $124_1$ of a secondary processor $120_1$. Accordingly, and an output buffer $124_2$ of the secondary processor $120_2$ is connected, via a system interface $126_3$, to an input buffer $122_3$ of a secondary processor $120_3$ (not shown). Correspondingly, via the interface 102, the primary processor 110 may be connected to at least one of a remote processor, a network, or a user controls means, which are collectively shown as a means 104.

The memory 130 generally includes a memory bank 111 of the primary processor 110, memory banks $121_1$-$121_K$ of the respective secondary processors $120_1$-$120_K$, and a memory bank 109 of the hardware graphics core 106. In one embodiment, these memory banks, together, form a shared memory block 134, which is accessible by the primary and secondary processors via a branch 131 (shown in phantom) of the memory bus 132. Alternatively (not shown), to increase efficiency during exchanges of large volumes of data in the shared memory block 134, the input and output buffers 124 may contain additional references (pointers) to memory space jointly used by the respective secondary processors 120.

In the depicted embodiment, the secondary processors $120_1$-$120_K$ and the hardware graphics core 106 include respective status registers $142_1$-$142_{K+1}$ and data ports $144_1$-$144_{K+1}$, and the primary processor 110 includes an input port 146. In one embodiment, the status registers $141_1$-$142_{K+1}$ contain status information for tasks executed by the corresponding secondary processors $120_1$-$120_K$ and the hardware graphics core 106. In an alternate embodiment (not shown), only a portion of the secondary processors $120_1$-$120_K$ or, optionally, the hardware graphics core 106 may include the status registers 142 and the data ports 144.

The data ports $144_1$-$144_{K+1}$ and the input port 146 are selectively coupled to the acknowledgements bus 140. Via the input port 144, the acknowledgements bus 140, and a respective data port 144, the primary processor 110 may directly access (i.e., read content of) the status registers 142. In an alternate embodiment, the acknowledgements bus 140 may be implemented as a direct input-output interface, for example, direct port or serial data input-output interface.

In one alternate embodiment, the primary processor 110 may directly access the status registers 142 via a link 147 (shown in phantom) coupling the I/O module 118 to the acknowledgements bus 140. In a further embodiment, via the acknowledgements bus 140, the status registers 142 may be accessed by remote processors (not shown), for example, processors monitoring performance of or debugging the system 100.

In another alternate embodiment, the respective registers 142 may be formed (shown in phantom) in the memory banks $121_1$-$121_K$ and 109. In still another alternate embodiment (not shown), the registers 142 may be associated with the shared memory block 134. In these embodiments, the memory bus 132 provides the primary processor 110 with a direct access to contents of at least the registers 142.

Figure 2:
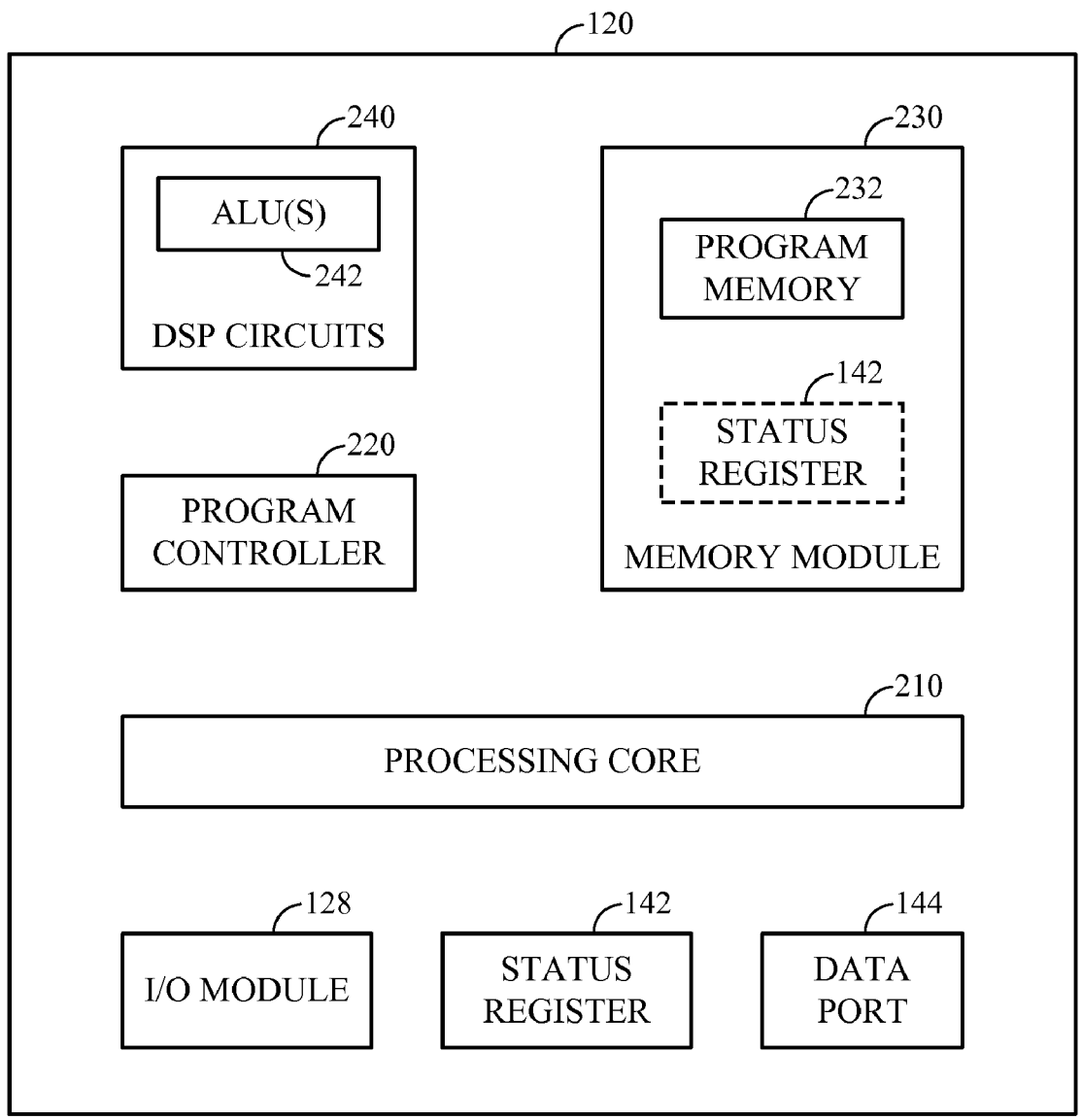
FIG. 2 shows a high-level block diagram of an exemplary pipelined processor of the system of FIG. 1.

FIG. 2 depicts a high-level block diagram of an exemplary pipelined secondary processor 120 of the system 100 of FIG. 1 in accordance with one embodiment of the present invention. The secondary processor 120 may be fabricated as a single IC, a portion thereof, or include several ICs. In embodiments, the secondary processor 120 may, for example, be a portion of a multi-processor GPU of a wireless communication apparatus, among other mobile or stationary video-enabled devices, as well as a portion of a networked server having architecture adapted for large-scale graphics processing.

Illustratively, the secondary processor 120 includes a processing core 210, a program controller 220, a memory module 230, digital signal processing (DSP) circuits 240 comprising a plurality of arithmetic-logic units (ALUs) 242, the I/O module 128, the status register 142, and the data port 144. In an alternate embodiment (shown in phantom), the status register 142 may be a portion of the memory module 230.

The memory module 230 includes a program memory 232, which contains one or more software modules that, in operation, define a content of the status register 142 and, via the data port 144, facilitate accessibility of the content by the primary processor 110 or other authorized user, as discussed above in reference to FIG. 1.

Figure 3:
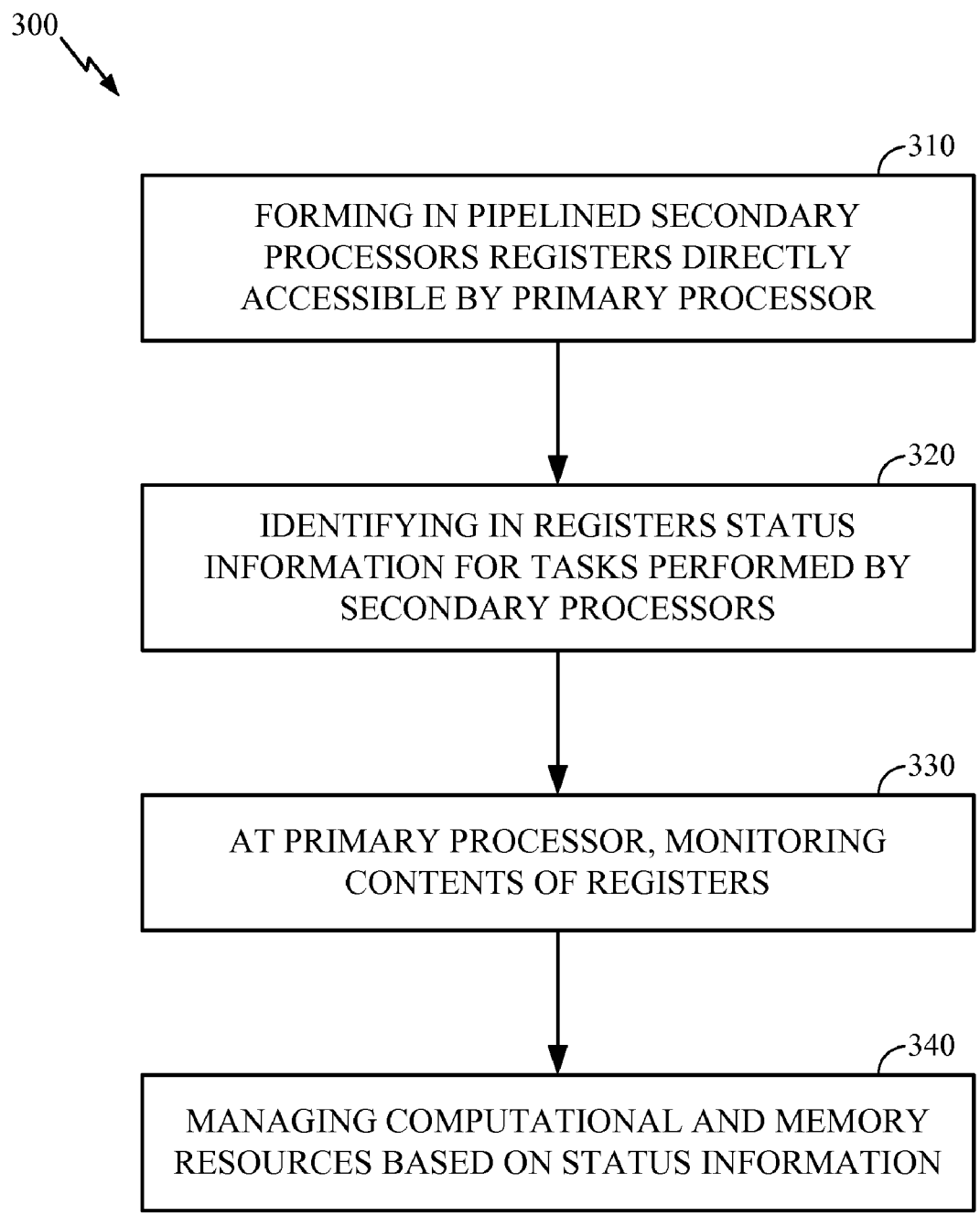
FIG. 3 shows a flow diagram of a method for managing computational and memory resources in the system of FIG. 1.

FIG. 3 shows a flow diagram of a method 300 for managing computational and memory resources in the system 100 of FIG. 1 in accordance with one embodiment of the present invention. In various embodiments, method steps of the method 300 are performed in the depicted order or at least two of these steps or portions thereof (e.g., steps 330 and 340) may be performed contemporaneously or in parallel. Those skilled in the art will readily appreciate that an order of executing at least a portion of other discussed below processes or routines may also be modified. To best understand the invention, the reader should simultaneously refer to FIGS. 1 and 3.

At step 310, the status registers 142 and data ports 144 are formed in the pipelined secondary processors 120 and the optional hardware graphics core 106 or the memory 130 of the multi-processor system 100, as discussed above in reference to FIG. 1. Contents of the status registers 142 are directly accessible by the primary processor 110 of system 100.

At step 320, in operation, secondary processors 120 identify when particular tasks assigned or monitored by the primary processor 110 are completed. Upon completion of such a task, the corresponding status information is entered, in a pre-determined data format, in the status register 142 of the respective secondary processor 120. The status information generally represents an acknowledgement, or confirmation, that the currently performed task is finished and, as such, the secondary processor and its computational and memory resources are available for the next task, as well as any resources of the primary processor that must be retained until completion of the task. For example, in graphics applications, such tasks may include repetitive cycles of processing graphics primitives, vertex buffer objects (VOBs), rendering video frames, and the like.

At step 330, via the input port 146 and acknowledgements bus 140, the primary processor 110 selectively accesses the status registers 142 and, with a pre-determined periodicity, acquires their contents. As such, the status information from a pipelined secondary processor 120 bypasses upstream intermediate processors and becomes available to the primary processor 110 immediately upon completion of the respective task, i.e., in a real time. Alternatively, the status registers 142 formed in the memory banks $121_1$-$121_K$ and 109 may directly be accessed by the primary processor 110 via the memory bus 130.

At step 340, the primary processor 110 analyzes the status information acquired from the status registers 142 and, in operation, manages computational and/or memory resources of the multi-processor system 100 based on that information. In particular, the primary processor 110 may allocate or re-allocate data between the respective memory blocks 111, $121_1$-$121_K$, and 109, selectively assign to or initiate new tasks in the respective secondary processors 120 or the hardware graphics core 106, and the like.

In exemplary embodiments, the method 300 may be implemented in hardware, software, firmware, or any combination thereof in a form of a computer program product comprising one or more computer-executable instructions. When implemented in software, the computer program product may be stored on or transmitted using a computer-readable medium, which includes computer storage medium and computer communication medium.

The term "computer storage medium" refers herein to any medium adapted for storing the instructions that cause the computer to execute the method. By way of example, and not limitation, the computer storage medium may comprise solid-sate memory devices, including electronic memory devices (e.g., RAM, ROM, EEPROM, and the like), optical memory devices (e.g., compact discs (CD), digital versatile discs (DVD), and the like), or magnetic memory devices (e.g., hard drives, flash drives, tape drives, and the like), or other memory devices adapted to store the computer program product, or a combination of such memory devices.

The term "computer communication medium" refers herein to any physical interface adapted to transmit the computer program product from one place to another using for example, a modulated carrier wave, an optical signal, a DC or AC current, and the like means. By way of example, and not limitation, the computer communication medium may comprise twisted wire pairs, printed or flat cables, coaxial cables, fiber-optic cables, digital subscriber lines (DSL), or other wired, wireless, or optical serial or parallel interfaces, or a combination thereof.

Herein, aspects of the present invention are illustratively described within the context of the processors of a multi-processor graphics pipeline. It will be appreciated by those skilled in the art that the invention may also be utilized within the context of other multi-processor systems having pipelined processors/co-processors, which are administered by one or more supervisory processor. Management of computational or memory resources in such systems using the techniques discussed above in reference to FIGS. 1-3 has been contemplated and is within the scope of the present invention. The invention may be used in cellular phones, video game consoles, PDAs, laptop computers, MP3 players and other graphics-enabled mobile or stationary devices having multi-processor architectures.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An integrated circuit (IC) comprising: a multi-processor system including a primary processor and a plurality of pipelined secondary processors, each of the secondary processors comprising a system interface for communicating with an upstream processor and a downstream processor, communication with the primary processor by at least one of the secondary processors using its system interface is by way of another secondary processor as its upstream processor, the at least one secondary processor including a register directly accessible by the primary processor, the register containing status information for tasks executed by the at least one secondary processor, a communication path other than the at least one secondary processor's system interface used for upstream communication is used for the status information to bypass the upstream processor, the status information for use by the primary processor in allocating data to one or more memory blocks and determining whether or not to assign another task to the at least one secondary processor.

2. The integrated circuit of claim 1, wherein the at least one secondary processor comprises a port for accessing the register.

3. The integrated circuit of claim 2, wherein the communication path includes a bus coupled to the port and accessible by the primary processor.

4. The integrated circuit of claim 3, wherein the primary processor is coupled to the bus.

5. The integrated circuit of claim 3, wherein the bus is coupled to at least one remote processor.

6. The integrated circuit of claim 1, wherein the register is a portion of a memory module of the at least one secondary processor.

7. The integrated circuit of claim 1, wherein the register is a portion of a memory of the multi-processor system.

8. The integrated circuit of claim 1, wherein the least one secondary processor is a portion of a graphics hardware core of the multi-processor system.

9. The integrated circuit of claim 1, wherein the integrated circuit is a portion of a system-on-chip (SoC) device.

10. The integrated circuit of claim 1, wherein the multi-processor system is a portion of a wireless communication apparatus selected from the group consisting of a cellular phone, a video game console, a personal digital assistant (PDA), a laptop computer, and an audio/video-enabled device, or a portion of a stationary video-enabled device, or a portion of a server.

11. A multi-processor system comprising:
a primary processor; and a plurality of pipelined secondary processors, each of the secondary processors comprising a system interface for communicating with an upstream processor and a downstream processor, communication with the primary processor by at least one of the secondary processors using its system interface is by way of another secondary processor as its upstream processor, the at least one secondary processor including a register directly accessible by the primary processor, the register containing status information for tasks executed by the at least one secondary processor, a communication path other than the at least one secondary processor's system interface used for upstream communication is used for the status information to bypass the upstream processor, the status information for use by the primary processor in allocating data to one or more memory blocks and determining whether or not to assign another task to the at least one secondary processor.

12. The multi-processor system of claim 11, wherein the at least one secondary processor comprises a port for accessing the register.

13. The multi-processor system of claim 12, the communication path comprising a bus selectively coupled to the port and accessible by the primary processor.

14. The multi-processor system of claim 13, wherein the primary processor is coupled to the bus.

15. The multi-processor system of claim 13, wherein the bus is coupled to at least one remote processor.

16. The multi-processor system of claim 11, wherein the register is a portion of a memory module of the at least one secondary processor.

17. The multi-processor system of claim 11, further comprising a memory, the register being a portion of the memory.

18. The multi-processor system of claim 11, wherein the least one secondary processor is a portion of a graphics hardware core.

19. The multi-processor system of claim 11, wherein the multi-processor system is a portion of a wireless communication apparatus selected from the group consisting of a cellular phone, a video game console, a personal digital assistant (PDA), a laptop computer, and an audio/video-enabled device, or a portion of a stationary video-enabled device, or a portion of a server.

20. The multi-processor system of claim 11, wherein the multi-processor system is a portion of a system-on-chip (SoC) integrated circuit device.

21. A multi-processor system comprising: a primary processor; and a plurality of pipelined secondary processors, each of the secondary processors comprising a system interface for communicating with an upstream processor and a downstream processor, communication with the primary processor by at least one of the secondary processors using its system interface is by way of another secondary processor as its upstream processor, the at least one secondary processor including first means directly accessible by the primary processor, the first means for storing status information on tasks executed by the at least one secondary processor, a communication path other than the at least one secondary processor's system interface used for upstream communication is used for the status information to bypass the upstream processor, the status information for use by the primary processor in allocating data to one or more memory blocks and determining whether or not to assign another task to the at least one secondary processor.

22. The multi-processor system of claim 21, wherein the at least one secondary processor comprises second means adapted for accessing the first means; and the communication path further comprising a bus coupled to the second means and to the primary processor.

23. The multi-processor system of claim 22, wherein the first means comprises a register, and the second means comprises a port coupled to the register.

24. The multi-processor system of claim 21, wherein the first means is a portion of a memory module of the at least one secondary processor.

25. The multi-processor system of claim 21, wherein the first means is a portion of a memory of the multi-processor system.

26. The multi-processor system of claim 21, wherein the multi-processor system is a portion of a wireless communication apparatus selected from the group consisting of a cellular phone, a video game console, a personal digital assistant (PDA), a laptop computer, and an audio/video-enabled device, or a portion of a stationary video-enabled device, or a portion of a server.

27. A computer program product including a computer readable medium having instructions for causing a multi-processor system including a primary processor and pipelined secondary processors to:

use registers to selectively contain status information for tasks executed by at least some of the secondary processors, each of the secondary processors comprising a system interface for communicating with an upstream processor and a downstream processor, communication with the primary processor by at least one of the secondary processors using its system interface is by way of another secondary processor as its upstream processor;

use a communication path other than the at least one secondary processor's system interface used for upstream communication for the status information to bypass the upstream processor and as direct access for the primary processor to the registers; and manage, by the primary processor, computational and/or memory resources of the multi-processor system based on the status information, the status information comprising information for use by the primary processor in allocating data to one or more memory blocks and determining whether or not to assign another task to the at least one secondary processor.

28. The computer program product of claim 27, wherein the registers are located in the at least some of the secondary processors or memories thereof or in a memory of the multi-processor system.

29. The computer program product of claim 27, wherein the multi-processor system is adapted for at least one of processing video data or rendering graphics in a wireless communication apparatus selected from the group consisting of a cellular phone, a video game console, a personal digital assistant (PDA), a laptop computer, and an audio/video-enabled device, or a portion of a stationary video-enabled device, or a portion of a server.

30. A method for managing computational and/or memory resources in a multi-processor system including a primary processor and pipelined secondary processors, comprising:

using registers to selectively contain status information for tasks executed by at least some of the secondary processors, each of the secondary processors comprising a system interface for communicating with an upstream processor and a downstream processor, communication with the primary processor by at least one of the secondary processors using its system interface is by way of another secondary processor as its upstream processor;

using a communication path other than the at least one secondary processor's system interface used for upstream communication for the status information to bypass the upstream processor and as direct access for the primary processor to the registers; and managing, by the primary processor, computational and/or memory resources of the multi-processor system based on the status information, the status information comprising information for use by the primary processor in allocating data to one or more memory blocks and determining whether or not to assign another task to the at least one secondary processor.

31. The method of claim 30, wherein the registers are located in the at least some of the secondary processors or memories thereof or in a memory of the multi-processor system.

* * * * *